US006628676B1

(12) United States Patent
Grohn et al.

(10) Patent No.: US 6,628,676 B1
(45) Date of Patent: Sep. 30, 2003

(54) SYSTEMS AND METHODS FOR COMMUNICATING MESSAGES AMONG CASCADED DEVICES BY BIT SHIFTING

(75) Inventors: Ossi I. Grohn, Apex, NC (US); Anthony S. Fugaro, Holly Springs, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/337,448

(22) Filed: Jun. 21, 1999

(51) Int. Cl.[7] .................................................. H04J 3/06
(52) U.S. Cl. ...................... 370/508; 370/347; 370/350; 370/503
(58) Field of Search ................................ 370/321, 322, 370/324, 326, 329, 330, 336, 337, 345, 347, 348, 350, 436, 442, 458, 468, 503, 508, 509, 505–507

(56) References Cited

U.S. PATENT DOCUMENTS

| | | | | |
|---|---|---|---|---|
| 3,700,819 A | * | 10/1972 | Marcus ........................ | 370/380 |
| 4,686,671 A | | 8/1987 | Burian et al. .................. | 370/88 |
| 4,932,024 A | * | 6/1990 | Bonicioli et al. ............ | 370/458 |
| 5,297,142 A | * | 3/1994 | Paggeot et al. .......... | 340/825.5 |
| 5,303,227 A | * | 4/1994 | Herold et al. ................ | 370/276 |
| 5,363,418 A | * | 11/1994 | Nakano et al. .............. | 370/305 |
| 5,422,876 A | * | 6/1995 | Turudic ....................... | 370/249 |
| 5,572,521 A | * | 11/1996 | Pauwels et al. ............. | 370/412 |
| 5,613,211 A | * | 3/1997 | Matsuno ....................... | 370/350 |
| 5,754,535 A | * | 5/1998 | Vandenabeele et al. ...... | 370/321 |
| 5,850,392 A | | 12/1998 | Wang et al. .................. | 370/335 |
| 5,887,267 A | | 3/1999 | Fugaro ........................ | 455/561 |
| 6,128,290 A | * | 10/2000 | Carvey ........................ | 370/347 |

FOREIGN PATENT DOCUMENTS

| | | |
|---|---|---|
| WO | WO 95/33346 | 12/1995 |
| WO | WO 96/37985 | 11/1996 |

OTHER PUBLICATIONS

International Search Report, PCT/US00/12755, Oct. 4, 2000.

* cited by examiner

*Primary Examiner*—Nay Maung
*Assistant Examiner*—John J Lee
(74) *Attorney, Agent, or Firm*—Myers Bigel Sibley & Sajovec

(57) ABSTRACT

Messages are communicated among a plurality of devices that are serially connected, such that a preceding device is connected to a succeeding device, by receiving a message from a preceding device, bit shifting the message that was received from the preceding device and transmitting the bit shifted message that was received from the preceding device to a succeeding device. When a message is received from a succeeding device, it also is bit shifted and the bit shifted message that was received from the succeeding device is transmitted to the preceding device. Preferably, messages that are received from the preceding device are shifted in a first direction such as left by a predetermined number of bits and messages that are received from the succeeding device are shifted in a second direction that is opposite the first direction such as right by the predetermined number of bits. Preferably, the predetermined number of bits corresponds to at least one TDMA slot. Prior to shifting the message that was received from the preceding device left by the predetermined number of bits, the predetermined number of leftmost bits is extracted from the message that was received from the preceding device. Moreover, after shifting the message that was received from the succeeding device right by the predetermined number of bits, the predetermined number of bits is inserted into the leftmost part of the message that was received from the succeeding device. Accordingly, each of the cascaded devices preferably extracts a downlink message from at least the first TDMA slot and then shifts the downlink message to the left by at least one slot. Similarly, each of the cascaded devices shifts an uplink TDMA message to the right by at least one slot and inserts its message into at least the first slot.

31 Claims, 7 Drawing Sheets

| FIG. 6A |
| FIG. 6B |

SYSTEMS AND METHODS FOR COMMUNICATING MESSAGES AMONG CASCADED DEVICES BY BIT SHIFTING

FIELD OF THE INVENTION

This invention relates to communications systems and methods, and more particularly to systems and methods for communicating messages among devices that are serially connected.

BACKGROUND OF THE INVENTION

Figure 1:
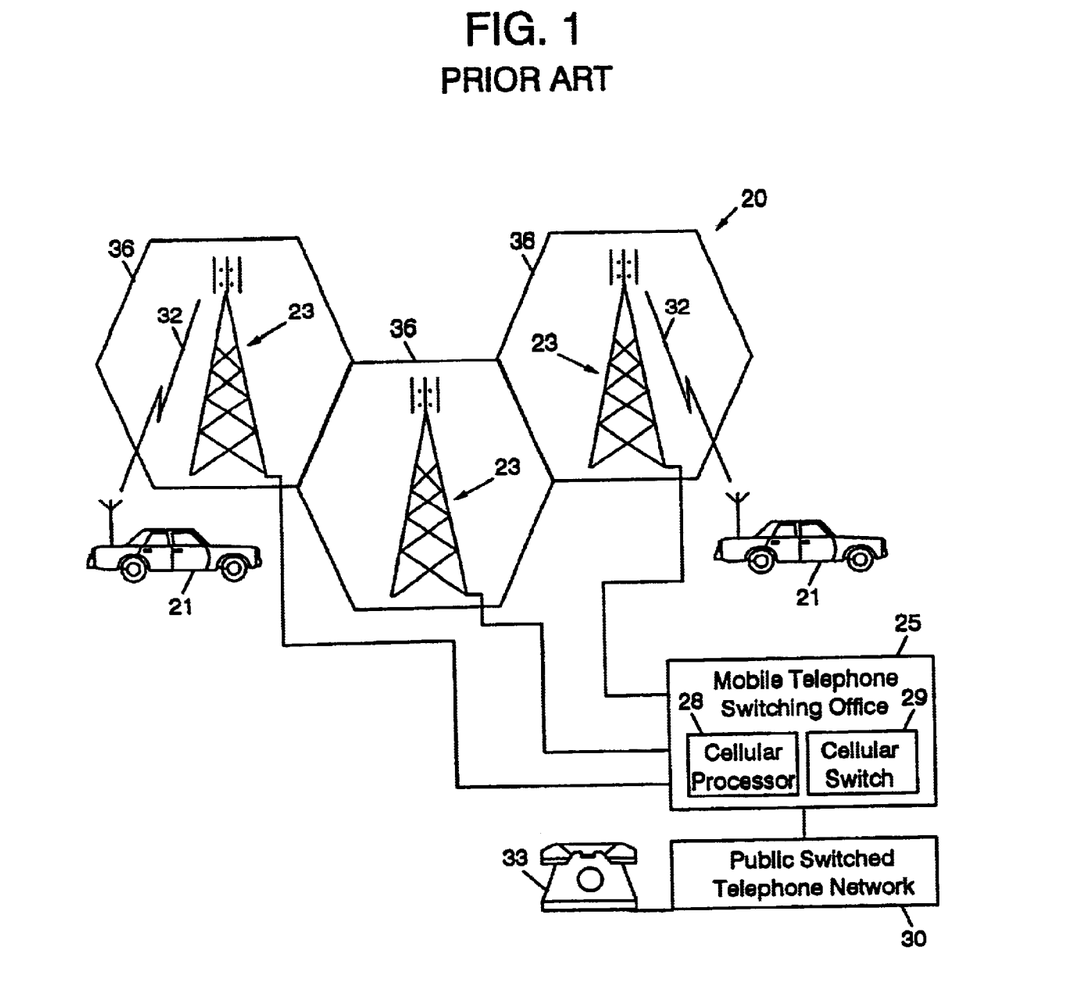
FIG. 1 illustrates an embodiment of a conventional cellular radiotelephone communications system.

Wireless and wired communications systems and methods are widely used for communicating among devices. The devices may include computers or communication devices, such as cellular radiotelephone base stations. Communication between a central unit and a plurality of devices may be arranged in a "hub and spoke" or "star" arrangement, in which a central unit is individually connected to a plurality of devices. FIG. 1 illustrates such a hub and spoke arrangement for a cellular radiotelephone communications system.

FIG. 1 illustrates a conventional terrestrial cellular radiotelephone communication system 20. The cellular radiotelephone system may include one or more radiotelephones 21, communicating with a plurality of cells 36 served by base stations 23 and a Mobile Telephone Switching Office (MTSO) 25. Although only three cells 36 are shown in FIG. 1, a typical cellular network may comprise hundreds of cells, may include more than one MTSO, and may serve thousands of radiotelephones.

The cells 36 generally serve as nodes in the communication system 20, from which links are established between radiotelephones 21 and the MTSO 25, by way of the base stations 23 serving the cells 36. Each cell will have allocated to it one or more dedicated control channels and one or more traffic channels. The control channel is a dedicated channel used for transmitting cell identification and paging information. The traffic channels carry the voice and data information. Through the communication system 20, a duplex radio communication link 32 may be effected between two mobile stations 21 or between a radiotelephone 21 and a landline telephone user 33. The function of the base station 23 is commonly to handle the radio communication between the cell and the mobile station 21. In this capacity, the base station 23 functions chiefly as a relay station for data and voice signals. As shown, a plurality of base stations 23 are directly connected to the MTSO 25 in a hub and spoke arrangement.

Traditional analog radiotelephone systems generally employ a system referred to as Frequency Division Multiple Access (FDMA) to create communications channels. As a practical matter well-known to those skilled in the art, radiotelephone communications signals, being modulated waveforms, typically are communicated over predetermined frequency bands in a spectrum of carrier frequencies. These discrete frequency bands serve as channels over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz. At present there are 832, 30-Khz wide, radio channels allocated to cellular mobile communications in the United States.

Conventional cellular systems also may employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Figure 2:
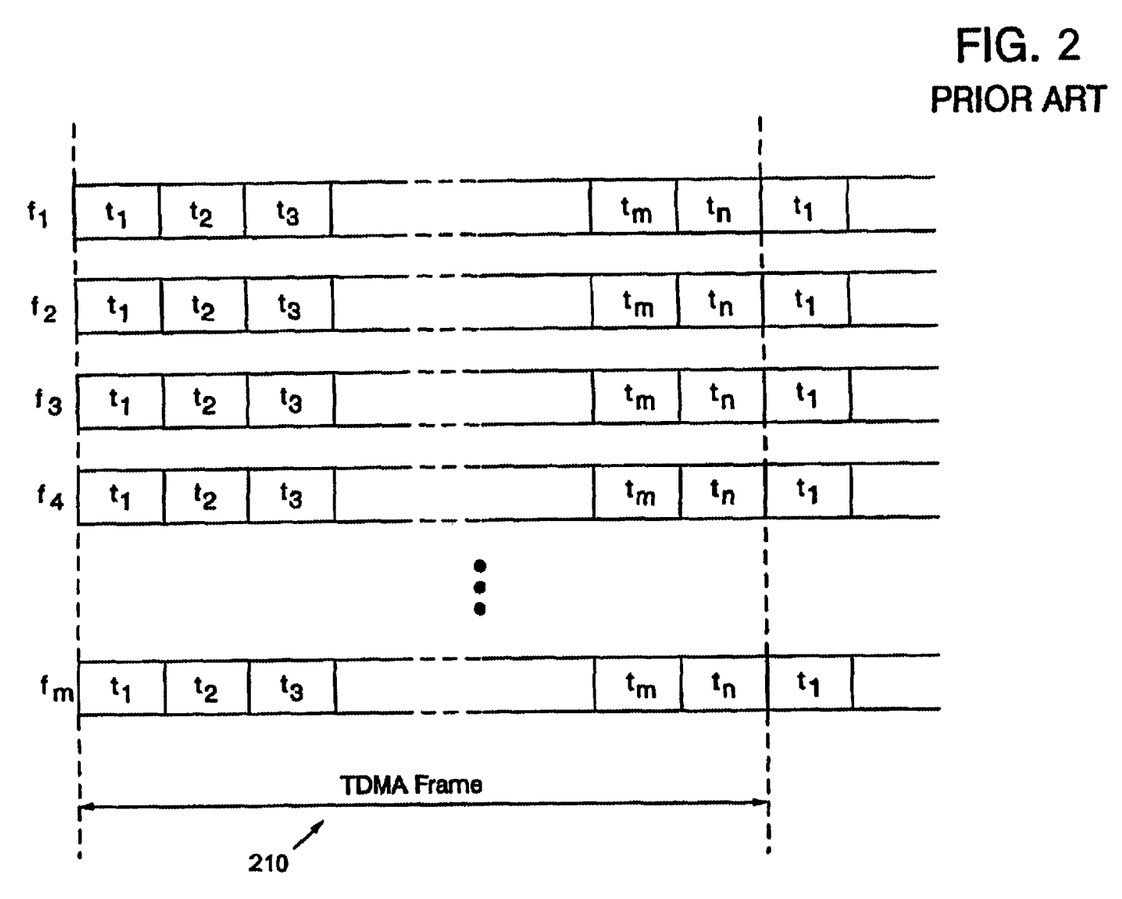
FIG. 2 illustrates a conventional TDMA frame.

Another technique which may further increase channel capacity and spectral efficiency is Time Division Multiple Access (TDMA). A TDMA system may be implemented by subdividing the frequency bands employed in conventional FDMA systems into sequential time slots, as illustrated in FIG. 2. Although communication on frequency bands $f_1$–$f_m$ typically occur on a common TDMA frame 210 that includes a plurality of time slots $t_1$–$t_n$, as shown, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, the digital IS-136 standard employed in the United States and the European GSM standard, which divides each of its frequency bands into 8 time slots. In these TDMA systems, each user communicates with the base station using bursts of digital data transmitted during the user's assigned time slots. A channel in a TDMA system typically includes one or more time slots on one or more frequency bands. See, for example, U.S. Pat. No. 5,850,292 to Wang et al., that is assigned to the assignee of the present invention, the disclosure of which is hereby incorporated herein by reference.

Figure 3:
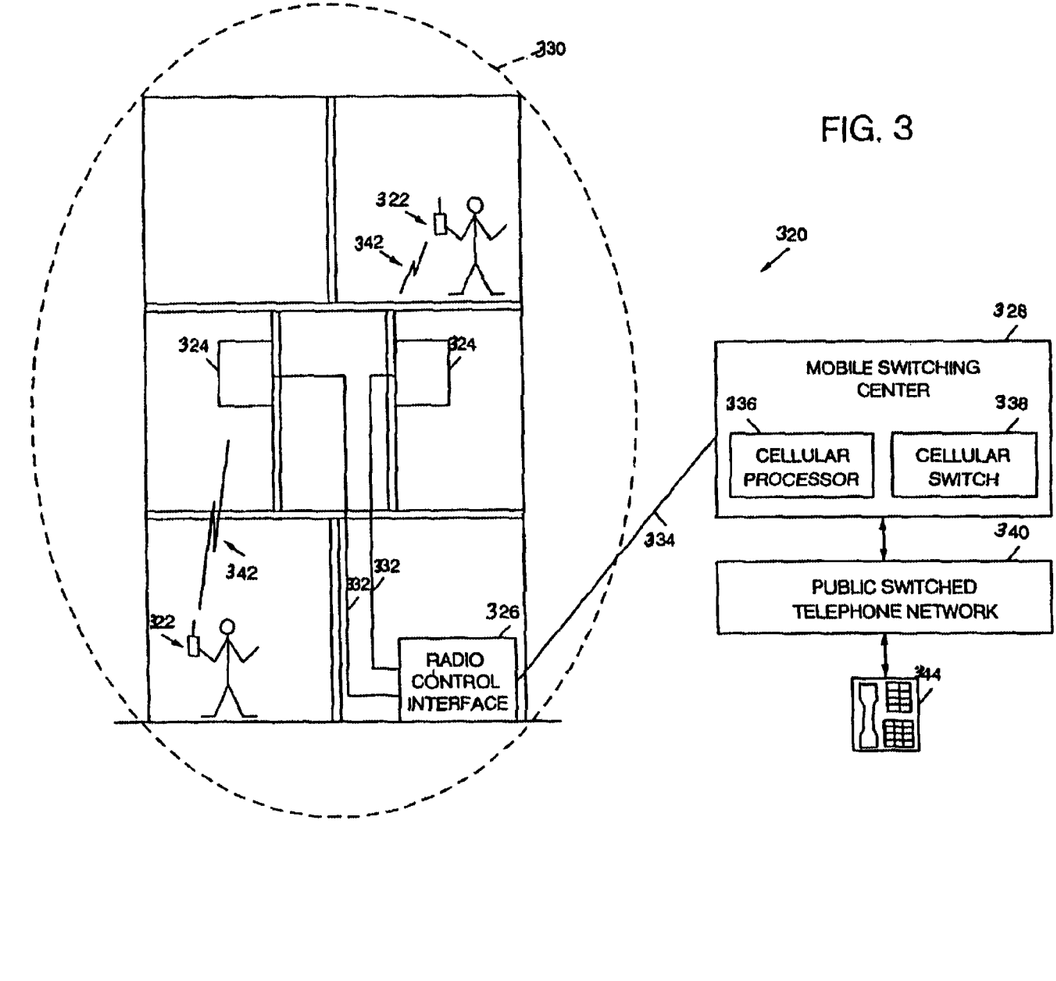
FIG. 3 illustrates a conventional indoor cellular communications system.

Another hub and spoke arrangement of communication devices is shown for an indoor cellular communication system in U.S. Pat. No. 5,887,267 to coinventor Fugaro, that is assigned to the assignee of the present invention, the disclosure of which is hereby incorporated herein by reference. FIG. 3 herein corresponds to FIG. 1 of the '267 patent. As described therein, capacity limitations of cellular radiotelephone systems have been addressed by using microcells or picocells, that is, low power cellular transmissions that provide coverage over a smaller area. The smaller microcells can allow more cells to exist within a predefined geographic area, thereby allowing an increase in the number of users that can be serviced within that geographic area. A particular application of microcell technology is indoor cellular radiotelephone services.

As illustrated in FIG. 3, a conventional indoor cellular network 320 includes one or more mobile stations or units 322, one or more base stations 324 also referred to as Radio Heads (RH), a Radio Control Interface (RCI) 326 also referred to as a Control and Radio Interface (CRI), and a mobile switching center (MSC) 328. Although only one cell 330 is shown in FIG. 3, a typical indoor cellular network may have several cells 330, each cell usually being serviced by one or more base stations 324. The number of base stations 324 may depend on the channel capacity of the cell 330. Each base station typically supports anywhere from 4–12 channels, depending upon its site. The cell 330 typically has one or more control channels and one or more voice/data (hereafter referred to as "traffic") channels allocated to it. The control channel typically is a dedicated channel used for transmitting cell identification and paging information.

Each base station 324 is connected to the radio control interface 326 by a radio interface link 332 in a hub and spoke configuration. The radio control interface 326 exchanges signals between the base stations 324 and the mobile switching center 328. Specifically, the radio control interface 326 converts the traffic and control information from the format received over the radio interface links 332 into a format suitable for transmission over a dedicated transmission link 334 interconnecting the radio control interface (RCI) 326 to the MSC 328. In the reverse direction, the RCI 326 converts the traffic and control information received over transmission link 334 into a format suitable for transmission over radio interface links 332 to the respective base stations 324.

The MSC 328 is the central coordinating element of the overall cellular network 320. It typically includes a cellular processor 336 and a cellular switch 338, and provides an interface to the public switched telephone network (PSTN) 340. Through the cellular network 320, a duplex radio communication link 342 may be effected between two mobile units 322 and a landline telephone user 344. The function of the base stations 324 is commonly to handle the radio communications with the mobile units 322. In this capacity, the base stations 324 also supervise the quality of the link 342 and monitor the received signal strength from the mobile units 322.

Another conventional interconnection of a central unit and a plurality of devices is a serial connection, also referred to as a "cascade" connection or a "daisy chain" connection. In this type of connection, a plurality of devices are serially connected such that a preceding device is connected to a succeeding device. Downlink messages are communicated from the central unit to the plurality of devices that are cascaded from the central unit. Uplink messages are communicated from the plurality of devices that are cascaded from the central unit, to the central unit. As was the case in hub and spoke connections, the messages may be TDMA frames having a plurality of slots. One well-known example of a cascade connection is the Small Computer Systems Interface (SCSI) that is used to connect peripherals to a personal computer.

Cascading may be advantageous because separate connections from each device to the central unit may be eliminated. The wiring of the communication network thereby may be simplified. Addition of devices also may be simplified. Finally, when each connection from a central unit is a leased line, such as a T1 line, the cost of the communication network may be reduced, since the number of leased lines from the central unit may be reduced.

Cascaded connections may be particularly advantageous in a microcell/picocell system such as an indoor cellular communications system of FIG. 3, wherein the Radio Control Interface (RCI) 326 may be located in one building, whereas the plurality of base stations 324 may be located in a second building. Thus, a leased line, such as a T1 line, may be used to connect the RCI 326 to a first base station, and the remaining base stations can be cascaded so that additional leased lines need not be used.

Unfortunately, it may be difficult to address cascaded devices efficiently, to allow unique identification of each cascaded device for uplink and downlink messages. In particular, when respective downlink and uplink messages are communicated from and to a central unit, to and from a plurality of devices that are cascaded from the central unit, each of the devices may need a unique address so that downlink and uplink communications may be properly directed to and received from an intended device. Accordingly, when installing a device, the device may need to be configured with a specific address. Moreover, a consistent addressing scheme may need to be maintained as devices are added or removed, so that addresses of other cascaded devices may need to be changed when devices are added or removed.

More specifically, when devices are cascaded in a TDMA communications system, each device may need to know the TDMA time slot mapping scheme in order to communicate with the central unit. Unique device addresses may need to be assigned and each device may need to be configured locally to enable communications with the central unit. This may reduce the flexibility and may increase the cost of systems and methods that communicate messages among a plurality of cascaded devices.

SUMMARY OF THE INVENTION

It is therefore an object of the present invention to provide improved systems and methods for communicating messages among a plurality of cascaded devices.

It is another object of the present invention to provide systems and methods for communicating messages in TDMA frames among a plurality of cascaded devices.

It is still another object of the present invention to provide systems and methods for communicating messages among cascaded devices, wherein each device need not be configured with a unique address to enable communication.

These and other objects may be provided, according to the present invention, by communicating messages among a plurality of devices that are serially connected, such that a preceding device is connected to a succeeding device, by receiving a message from a preceding device, bit shifting the message that was received from the preceding device and transmitting the bit shifted message that was received from the preceding device to a succeeding device. When a message is received from a succeeding device, it also is bit shifted and the bit shifted message that was received from the succeeding device is transmitted to the preceding device. Preferably, messages that are received from the preceding device are shifted in a first direction such as left by a predetermined number of bits and messages that are received from the succeeding device are shifted in a second direction that is opposite the first direction such as right by the predetermined number of bits. Preferably, the predetermined number of bits corresponds to at least one TDMA slot.

Prior to shifting the message that was received from the preceding device left by the predetermined number of bits, the predetermined number of leftmost bits is extracted from the message that was received from the preceding device. Moreover, after shifting the message that was received from the succeeding device right by the predetermined number of bits, the predetermined number bits is inserted into the leftmost part of the message that was received from the succeeding device.

Accordingly, each of the cascaded devices preferably extracts a downlink message from at least the first TDMA slot and then shifts the downlink message to the left by at least one slot. Similarly, each of the cascaded devices shifts an uplink TDMA message to the right by at least one slot and inserts its message into at least the first slot.

Since each of the cascaded devices inserts a message into and extracts a message from the same slot(s), it need not be locally configured with a predefined address. Only the central unit need have knowledge of the order in which devices are cascaded, to thereby place the messages in and retrieve the messages from the appropriate TDMA slots. The devices themselves may be identical and do not need to include a programmed address. The installation and configuration of cascaded devices thereby may be simplified and the implementation of addressing in the devices also may be simplified. It will be understood that the present invention may be provided as communication methods, communication systems and individual devices that are cascaded.

BRIEF DESCRIPTION OF THE DRAWINGS

FIGS. 6A and 6B, which when placed adjacent one another as shown form FIG. 6, illustrate an embodiment of systems and methods of the present invention that may be employed with micro/pico cellular systems that may be used in an indoor cellular communication system.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be understood that when an element such as a device is referred to as being "connected to" another element, it can be directly connected to the other element or intervening elements may also be present. In contrast, when an element is referred to as being "directly connected to" another element, there are no intervening elements present.

Figure 4:
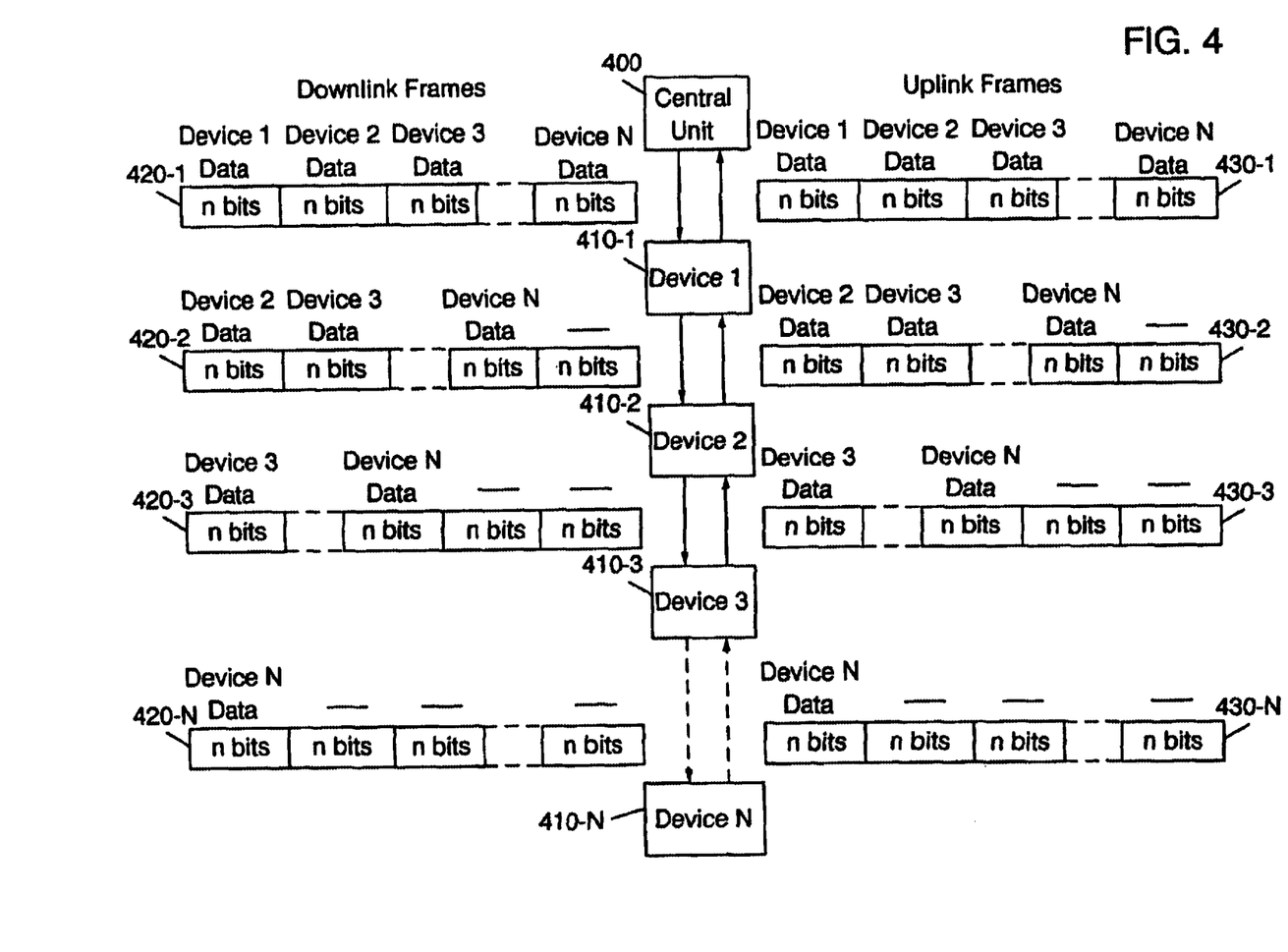
FIG. 4 illustrates systems and methods for communicating messages among a plurality of devices that are serially connected or cascaded, according to the present invention.
Figure 5:
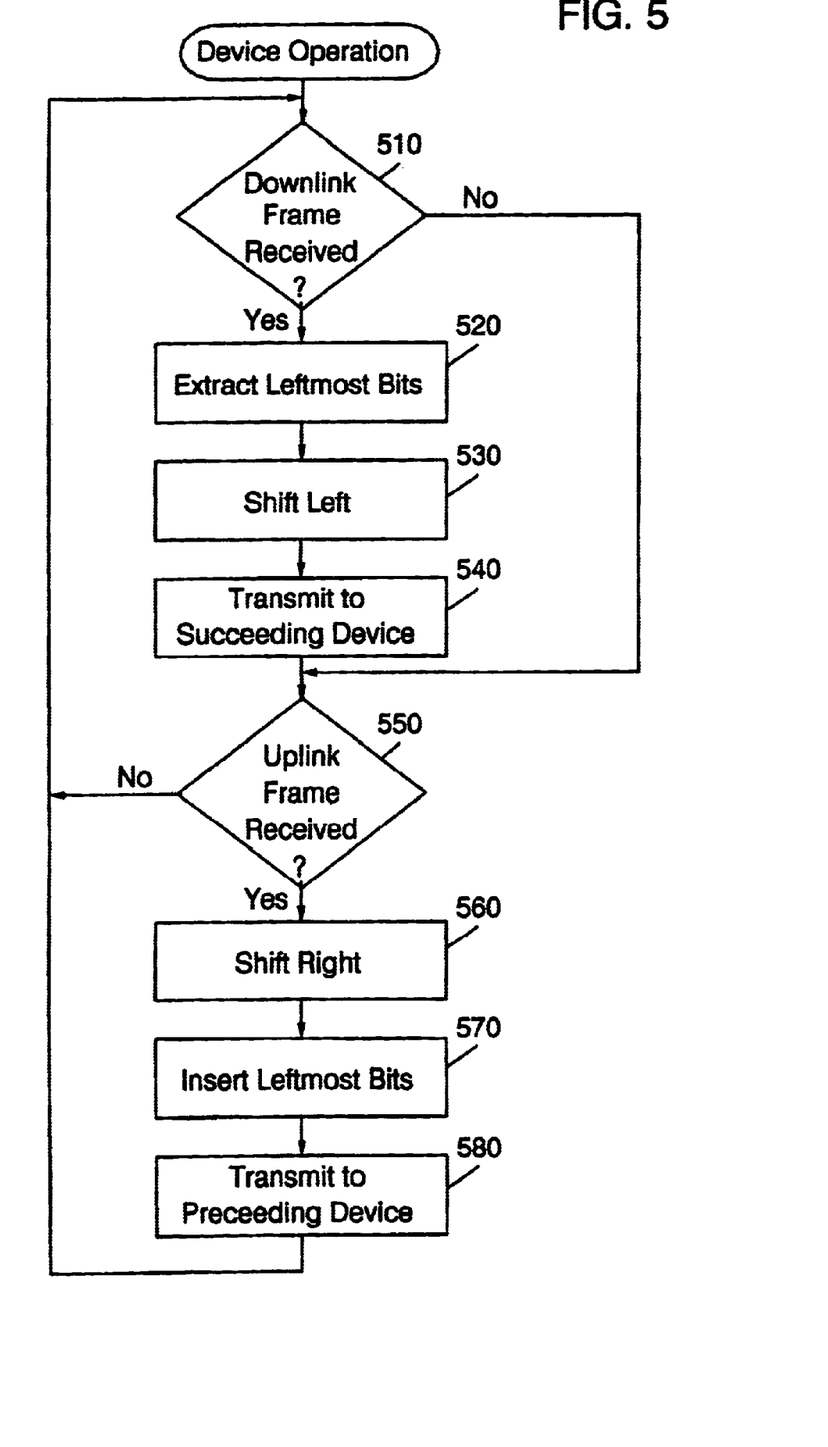
FIG. 5 is a flowchart of detailed operations that can be performed by a device according to the present invention.
Figures 6, 6B:
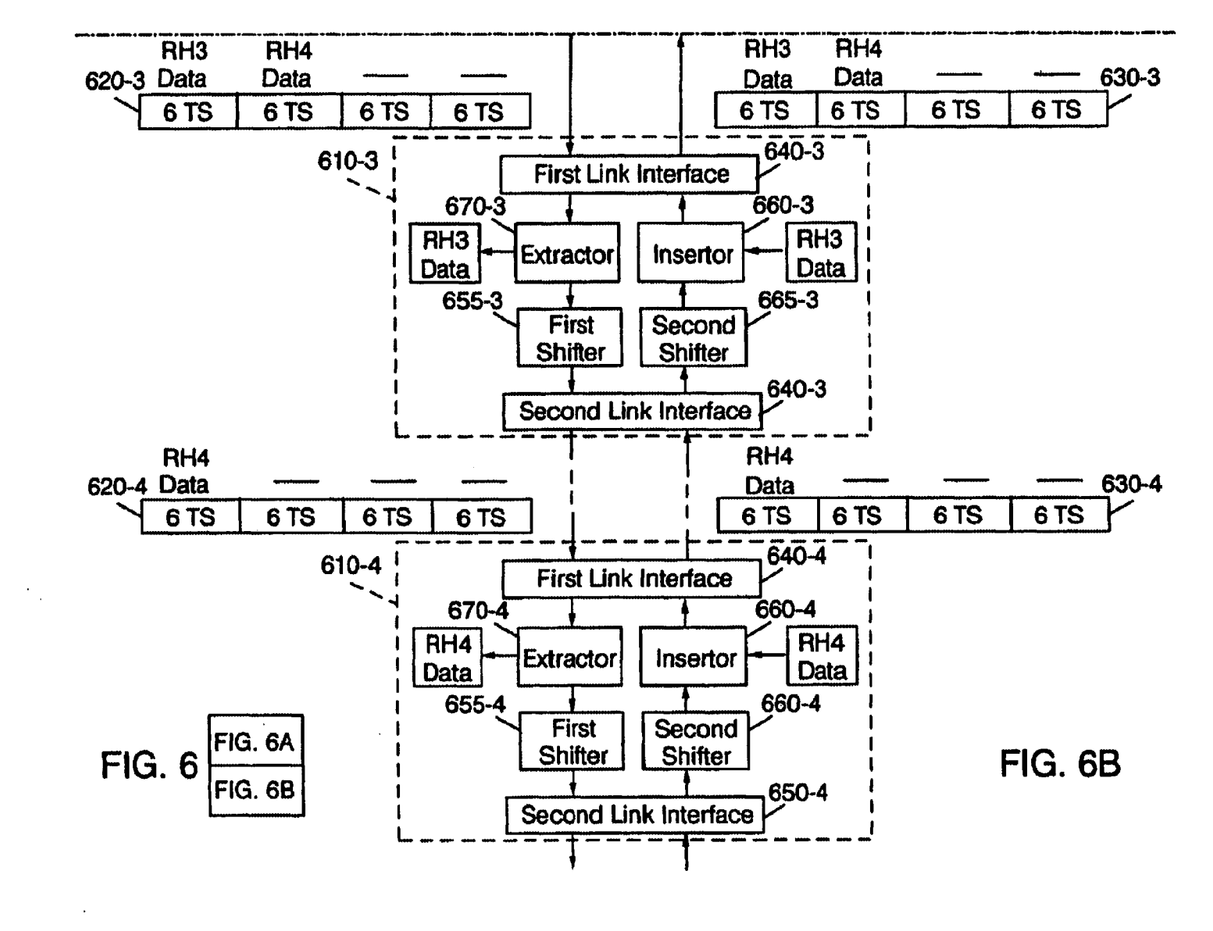
Figure 6A:
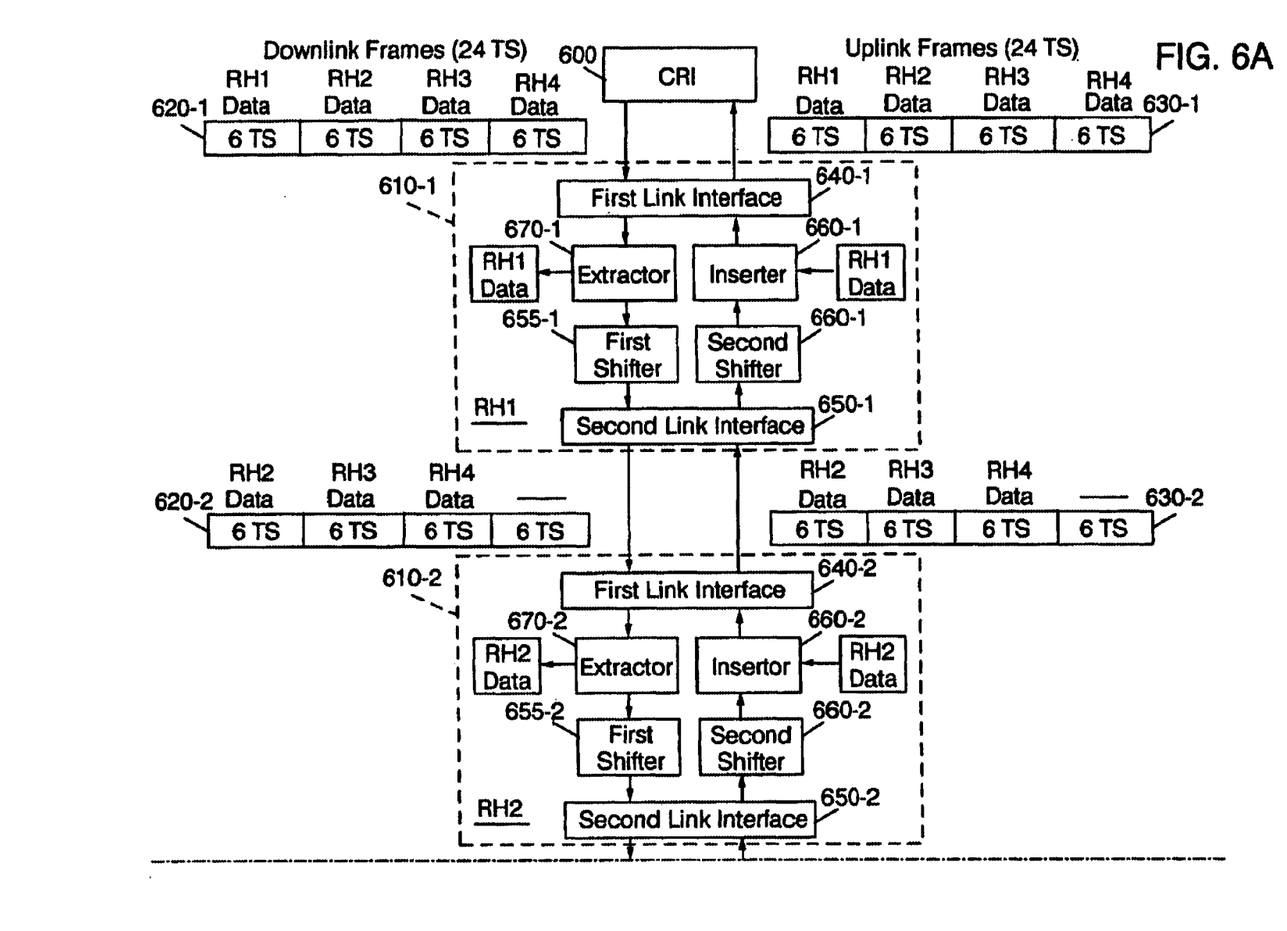

Various aspects of the present invention are illustrated in detail in FIGS. 4–6, including flowchart illustrations. It will be understood that individual blocks of the figures, and combinations of blocks in the figures, can be implemented by computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the block or blocks.

Accordingly, blocks of the figures support combinations of means for performing the specified functions, combinations of steps for performing the specified functions and program instruction means for performing the specified functions. It will also be understood that individual blocks of the figures, and combinations of blocks in the figures, can be implemented by special purpose hardware-based computer systems which perform the specified functions or steps, or by combinations of special purpose hardware and computer instructions.

FIG. 4 illustrates systems and methods for communicating messages among a plurality of devices that are serially connected or cascaded, according to the present invention. As shown in FIG. 4, a plurality of devices 410-1 through 410-N, labeled Device 1 through Device N, are serially connected to a central unit 400, such that a preceding device, such as Device 1 is connected to a succeeding device, such as Device 2. Downlink messages in the form of downlink TDMA frames 420-1 through 420-N are transmitted from the central unit 400, serially to the plurality of cascaded devices 410-1 through 410-N. Similarly, uplink frames 430-1 through 430-N are serially transmitted from the devices 410-1 through 410-N to the central unit 400.

As also shown in FIG. 4, each device receives a downlink frame, extracts the first n bits, shifts the downlink frame to the left by n bits and then sends the downlink frame to the succeeding device. Thus, for example, Device 2 receives the downlink frame 420-2, extracts the first n bits as Device 2 data, shifts the downlink frame 420-2 to the left by n bits and sends the extracted and shifted downlink frame 420-3 to the succeeding device Device 3.

Similarly, for uplink frames from the devices 410-1 through 410-N to the central unit 400, a preceding device receives a message from a succeeding device, shifts the message right by n bits, inserts its own data into the leftmost bits and transmits the shifted and inserted frame to the preceding device. Thus, for example, Device 2 receives an uplink frame 430-3 from Device 3, shifts the uplink frame 430-3 frame to the right n bits, inserts the Device 2 data into the leftmost n bits and sends the inserted and shifted frame 430-2 to the preceding device Device 1. Accordingly, a device need not know where in the cascade it is located. It can always extract data from the first n bits and can insert data into the first n bits. Only the central unit 400 may need to know the order or sequence in which the devices 410-1 through 410-N are cascaded.

FIG. 5 is a flowchart that illustrates detailed operations that can be performed by a device 410-1 through 410-N according to the present invention. Referring now to FIG. 5, when a downlink TDMA frame is received at Block 510, predetermined bits are extracted therefrom, which provide the data for the device. Preferably, as shown at Block 520, the leftmost bits are extracted, although other predetermined combinations of bits may be extracted, provided that each device preferably extracts the same bit positions. Then, at Block 530, the frame is shifted to eliminate the extracted bits. In particular, at Block 530, the frame is shifted left by the number of bits that were extracted. It will be understood that the rightmost bits may be loaded with a dummy pattern which has all zeros or all ones, or any other pattern, because these bits now become "don't care" bits that do not comprise data for any of the devices. Alternatively, a dummy pattern need not be loaded. Then, at Block 540, the extracted and shifted TDMA frame is transmitted to the succeeding device.

When an uplink frame is received at Block 550, the frame is shifted so that the predetermined bit locations are available for accepting data from the device. Preferably, at Block 560, the frame is shifted right by the predetermined number of bits. Bits are then inserted into the predetermined bit positions, for example by inserting data for the device into the leftmost bits, at Block 570. Then, at Block 580, the shifted and inserted TDMA frame is transmitted to the preceding device.

The operations of FIG. 5 preferably are performed identically by each device. Accordingly, each device need not be addressed and need not know its location among the devices that are serially connected. Only the central unit may need to know the location of the devices for proper insertion of messages into the downlink frames and proper retrieval of messages from the uplink frames. Accordingly, installation and configuration of cascaded devices may be simplified.

It also will be understood by those having skill in the art that, although the bit shifting for uplink and downlink frames preferably are inverses of each other, different numbers of bits may be shifted in the uplink and downlink frames. Moreover, the bit positions that are used may differ in the uplink and downlink frames, although they preferably are the same. Although the leftmost bit positions preferably are used for extraction and insertion of data, other bit positions may be used as long as they preferably are consistently used among the devices. Finally, although FIG. 4 illustrates shifting by one slot, shifting that may take place for multiple slots or fractions of a slot. Time slot remapping is therefore provided by each device, and each device preferably remaps the time slots identically.

Thus, each device 410-1 through 410-N preferably uses a fixed number of bits (n) in the communication link frame of nxN bits from the central unit in downlink communications. The first device 410-1 preferably extracts the first set of n bits, shifts all remaining bits to the left by the same number n, and retransmits the frame to the next device in the chain. All devices preferably perform the same operation regardless of their location in the chain. For communication from the devices 410-1 through 410-N to the central unit 400, also referred to as uplink, the opposite preferably takes place. A device preferably shifts the incoming frame to the right by n bits, inserts its own n bits in the beginning of the frame and transmits the entire frame of nxN bits to the preceding device in the chain.

FIG. 6 illustrates an embodiment of systems and methods of the present invention that may be employed with micro/pico cellular base station systems that may be used in an indoor cellular communication system. Thus, in FIG. 6, the central unit may be a centralized Control and Radio Interface (CRI) 600 that is connected to a plurality of cascaded Radio Heads (RH1–RH4) 610-1 through 610-4. In the embodiment of FIG. 6, four radio heads are used. However, it will be understood that fewer or more radio heads may be used. Also, in the embodiment of FIG. 4, the uplink frame and a downlink frame both include 24 time slots (TS) with the data for each radio head (RH1 Data through RH4 Data) occupying six time slots. In another embodiment, 32 time slots may be included in an uplink frame or a downlink frame, so that five radio heads may be cascaded.

As shown in FIG. 6, each radio head 610-1 through 610-4 includes a first link interface 640-1 through 640-4 that connects to a preceding device in the cascaded chain of devices, and a second link interface 650-1 through 650-4 that connects to a succeeding device in the cascaded chain of devices. Each first link interface 640-1 through 640-4 may be regarded as including a downlink receiver and an uplink transmitter. Each second link to interface 650-1 through 650-4 also may be regarded as including an uplink receiver and a downlink transmitter.

Each radio head 610-1 through 610-4 also includes an extractor 670-1 through 670-4 responsive to the first link interface, to extract the predetermined number of leftmost bits from the message 620-1 through 620-4 that was received from the first link interface. A first shifter 665-1 through 665-4 is responsive to the first extractor 670-1 through 670-4, to shift the message that is received from the first link interface to the left and to provide the left-shifted message that is received from the first link interface to the second link interface 650-1 through 650-4.

As also shown in FIG. 6, each radio head 610-1 through 610-4 also includes a second shifter 660-1 through 660-4 that is responsive to the second link interface 650-1 through 650-4, to shift a message that is received from the second link interface to the right. An inserter 680-1 through 680-4 is responsive to the second shifter 660-1 through 660-4, to insert the leftmost bits into the right shifted message, and to provide the right shifted message with the inserted leftmost bits 630-1 through 630-4 to the first link interface 640-1 through 640-4.

Accordingly, in FIG. 6, in the downlink direction, each radio head extracts the time slots for its use, shifts all remaining time slots to the left by six and retransmits the frame to the next radio head in the chain. In the uplink direction, the opposite takes place. Each radio head shifts the incoming frame to the right six time slots, inserts its own six time slots in the beginning of the frame and transmits the frame to the preceding radio head in the chain. All radio heads may perform the same operations regardless of their location in the chain. Accordingly, operations of FIG. 5 may be performed by each radio head. Cascaded devices therefore may be used without requiring that each device be configured with an address. Installation and configuration of cascaded devices thereby may be simplified.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of communicating messages among at least three devices that are serially connected such that a preceding device is connected to a succeeding device, the method comprising the steps of:

receiving a message from a preceding device;

bit shifting the message that was received from the preceding device;

transmitting the bit shifted message that was received from the preceding device to a succeeding device;

receiving a message from a succeeding device;

bit shifting the message that was received from the succeeding device; and transmitting the bit shifted message that was received from the succeeding device to the preceding device.

2. A method according to claim 1:

wherein the step of bit shifting the message that was received from the preceding device comprises the step of shifting the message that was received from the preceding device in a first direction by a predetermined number of bits; and wherein the step of bit shifting the message that was received from the succeeding device comprises the step of shifting the message that was received from the succeeding device in a second direction that is opposite the first direction by the predetermined number of bits.

3. A method according to claim 2 wherein the messages are Time Division Multiple Access (TDMA) messages comprising a plurality of slots, each slot comprising the predetermined number of bits.

4. A method according to claim 2:
   wherein the first direction is left and the second direction is right;
   wherein the step of shifting the message that was received from the preceding device in a first direction by a predetermined number of bits is preceded by the step of extracting the predetermined number of leftmost bits from the message that was received from the preceding device; and
   wherein the step of shifting the message that was received from the succeeding device in the second direction by the predetermined number of bits is followed by the step of inserting the predetermined number of leftmost bits into the message that was received from the succeeding device.

5. A method according to claim 1 wherein the at least three devices are at least three wireless radiotelephone base stations that are serially connected to a central unit.

6. A method of communicating a downlink Time Division Multiple Access (TDMA) frame having a plurality of slots, from a central unit to a corresponding plurality of devices that are cascaded from the central unit, the method comprising the following steps that are performed in the cascaded devices:
   shifting a received downlink frame in a first direction by at least one slot; and
   transmitting the shifted downlink frame;
   the method further comprising the following steps that are performed in the cascaded devices to communicate an uplink TDMA frame from the plurality of devices to the central unit:
      shifting a received uplink frame in a second direction that is opposite the first direction by at least one slot; and
      transmitting the shifted uplink frame.

7. A method according to claim 6:
   wherein the first direction is left and the second direction is right;
   wherein the step of shifting a received downlink frame in a first direction by at least one slot is preceded by the step of extracting at least one leftmost slot from the received downlink frame; and
   wherein the step of shifting a received uplink frame in the second direction by at least one slot is followed by the step of inserting at least one leftmost slot into the received uplink frame.

8. A method according to claim 6 wherein the central unit is a Control and Radio Interface (CRI) and wherein the devices are base stations.

9. A method of communicating downlink and uplink Time Division Multiple Access (TDMA) frames having a plurality of slots, from and to a central unit, to and from a plurality of devices that are cascaded from the central unit, the method comprising the steps of:
   extracting a message from at least one same slot of a received downlink TDMA frame in the cascaded devices; and
   inserting a message into at least one same slot of a received uplink TDMA frame in the cascaded devices;
   wherein the step of extracting is followed by the step of shifting the received downlink TDMA frame by the at least one slot in the cascaded devices; and
   wherein the step of inserting is preceded by the step of shifting the received uplink TDMA frame by the at least one slot in the cascaded devices.

10. A method according to claim 9:
   wherein the same slot of a received downlink TDMA frame is at least one leftmost slot of a received downlink TDMA frame;
   wherein the same slot of a received uplink TDMA frame is the at least one leftmost slot of a received uplink TDMA frame;
   wherein the step of shifting the received downlink TDMA frame by at least one slot comprises the step of shifting the received downlink TDMA frame left by at least one slot; and
   wherein the step of shifting the received uplink TDMA frame by at least one slot comprises the step of shifting the received uplink TDMA frame right by at least one slot.

11. A method according to claim 9 wherein the central unit is a Control and Radio Interface (CRI) and wherein the devices are base stations.

12. A communications system comprising:
   at least three devices that are serially connected such that a preceding device is connected to a succeeding device, each of the at least three devices comprising:
      means for receiving a message from a preceding device;
      means for bit shifting the message that was received from the preceding device;
      means for transmitting the bit shifted message that was received from the preceding device to a succeeding device;
      means for receiving a message from a succeeding device;
      means for bit shifting the message that was received from the succeeding device; and
      means for transmitting the bit shifted message that was received from the succeeding device to the preceding device.

13. A system according to claim 12:
   wherein the means for bit shifting the message that was received from the preceding device comprises means for shifting the message that was received from the preceding device in a first direction by a predetermined number of bits; and
   wherein the means for bit shifting the message that was received from the succeeding device comprises means for shifting the message that was received from the succeeding device in a second direction that is opposite the first direction by the predetermined number of bits.

14. A system according to claim 12 wherein the messages are Time Division Multiple Access (TDMA) messages comprising a plurality of slots, each slot comprising the predetermined number of bits.

15. A system according to claim 13 wherein the first direction is left and the second direction is right, the system further comprising:
   means for extracting the predetermined number of leftmost bits from the message that was received from the preceding device, wherein the means for shifting the message that was received from the preceding device left by a predetermined number of bits is responsive to the means for extracting; and
   means for inserting the predetermined number of leftmost bits into the message that was received from the succeeding device, wherein the means for shifting the message that was received from the succeeding device right by the predetermined number of bits is responsive to the means for inserting.

16. A system according to claim 12 wherein the at least three devices are a plurality of wireless radiotelephone base stations that are serially connected to a central unit.

17. A communications system comprising:
a central unit that transmits a downlink Time Division Multiple Access (TDMA) frame having a plurality of slots; and
a corresponding plurality of devices that are cascaded from the central unit, the cascaded devices comprising means for shifting a received downlink frame in a first direction by at least one slot and means for transmitting the shifted downlink frame;
wherein the central unit further receives an uplink TDMA frame from the plurality of devices;
the plurality of devices further comprising means for shifting a received uplink frame in a second direction that is opposite the first direction by at least one slot and means for transmitting the shifted uplink frame.

18. A system according to claim 17 wherein the first direction is left, the second direction is right and wherein the plurality of devices further comprises:
means for extracting at least one leftmost slot from the received downlink frame, the means for shifting a received downlink frame left by at least one slot being responsive to the means for extracting; and
means for inserting at least one leftmost slot into the received uplink frame in response to the means for shifting a received uplink frame right by at least one slot.

19. A system according to claim 17 wherein the central unit is a Control and Radio Interface (CRI) and wherein the devices are base stations.

20. A communications system comprising:
a central unit; and
a plurality of devices that are cascaded from the central unit;
the central unit comprising means for transmitting downlink Time Division Multiple Access (TDMA) frames having a plurality of slots to the plurality of devices and for receiving uplink TDMA frames having a plurality of slots from the plurality of devices; and
each of the plurality of devices comprising means for extracting a message from at least one same slot of a received downlink TDMA frame and means for inserting a message into at least one same slot of a received uplink TDMA frame;
wherein each of the plurality of devices further comprises:
means for shifting the received downlink TDMA frame by at least one slot in response to the means for extracting; and
means for shifting the received uplink TDMA frame by at least one slot wherein the means for inserting is responsive to the means for shifting the received uplink TDMA frame by at least one slot.

21. A system according to claim 20:
wherein the same slot of a received downlink TDMA frame is at least one leftmost slot of a received downlink TDMA frame;
wherein the same slot of a received uplink TDMA frame is at least one leftmost slot of a received uplink TDMA frame;
wherein the means for shifting the received downlink TDMA frame by at least one slot comprises means for shifting the received downlink TDMA frame left by at least one slot; and wherein the means for shifting the received uplink TDMA frame by at least one slot comprises means for shifting the received uplink TDMA frame right by at least one slot.

22. A system according to claim 20 wherein the central unit is a Control and Radio Interface (CRI) and wherein the devices are base stations.

23. A communications device comprising:
a first link interface that connects to a preceding communications device in a cascading chain of devices;
a second link interface that connects to a succeeding communications device in the cascading chain of devices;
a first shifter that is responsive to the first link interface, to shift a message that is received from the first link interface and to provide the shifted message that is received from the first link interface to the second link interface; and
a second shifter that is responsive to the second link interface, to shift a message that is received from the second link interface and to provide the shifted message that is received from the second link interface to the first link interface.

24. A device according to claim 23 wherein the first shifter is a first direction shifter and wherein the second shifter is a second direction shifter, wherein the second direction is opposite the first direction.

25. A device according to claim 24 wherein the messages are Time Division Multiple Access (TDMA) messages comprising a plurality of slots, each slot comprising a predetermined number of bits, and wherein the first and second shifters shift in the first and second directions by at least the predetermined number of bits.

26. A device according to claim 24 wherein the first direction is left and the second direction is right, the device further comprising:
an extractor that is responsive to the first link interface to extract the predetermined number of leftmost bits from the message that was received from the first link interface, wherein the first direction shifter is responsive to the extractor; and
an inserter that is responsive to the second direction shifter to insert the predetermined number of leftmost bits into the right shifted message, and to provide the right shifted message with the inserted leftmost bits to the first link interface.

27. A device according to claim 23 wherein the device is a wireless radiotelephone base station.

28. A communications device comprising:
a downlink receiver that receives downlink Time Division Multiple Access (TDMA) frames having a plurality of slots from a preceding device in a cascading chain of devices;
a first shifter that shifts a received downlink TDMA frame by at least one slot;
a downlink transmitter that transmits the shifted received downlink TDMA frame to a succeeding device in the cascading chain of devices;
an uplink receiver that receives uplink TDMA frames having the plurality of slots from the succeeding device in the cascading chain of devices;
a second shifter that shifts a received uplink TDMA frame by at least one slot; and
an uplink transmitter that transmits the shifted received uplink TDMA frame to the preceding device in the cascading chain of devices.

29. A device according to claim 28 wherein the first shifter is a first direction shifter and wherein the second shifter is a second direction shifter.

30. A device according to claim 29 wherein the first direction is left and the second direction is right, the device further comprising:

an extractor that extracts at least a leftmost slot from the received downlink frame, the first direction shifter being responsive to the extractor; and     an inserter that inserts at least a leftmost slot into the received uplink frame in response to the second direction shifter.

31. A device according to claim 28 wherein the device is a base station of a wireless radiotelephone communication system.

* * * * *